US008483884B1

(12) United States Patent
Williams

(10) Patent No.: US 8,483,884 B1
(45) Date of Patent: Jul. 9, 2013

(54) MODEL AIRPLANE AUTOMATIC FUEL PUMP CONTROLLER APPARATUS

(76) Inventor: Junior Lloyd Williams, St. Catherine (JM)

( * ) Notice: Subject to any disclaimer, the term of this patent is extended or adjusted under 35 U.S.C. 154(b) by 661 days.

(21) Appl. No.: 12/541,354

(22) Filed: Aug. 14, 2009

(51) Int. Cl.

| | |
|---|---|
| ***G05D 7/00*** | (2006.01) |
| ***G05D 11/00*** | (2006.01) |
| ***F02B 53/10*** | (2006.01) |
| ***F02D 31/00*** | (2006.01) |
| ***F02M 57/02*** | (2006.01) |
| ***F02M 37/04*** | (2006.01) |
| ***F17D 1/00*** | (2006.01) |
| ***B08B 3/00*** | (2006.01) |
| ***B08B 5/00*** | (2006.01) |
| ***F16L 55/10*** | (2006.01) |
| ***F17C 13/00*** | (2006.01) |
| ***B60Q 1/00*** | (2006.01) |

(52) U.S. Cl.
USPC ........... 700/282; 123/206; 123/359; 123/446; 123/495; 137/2; 137/15.04; 137/15.08; 340/450.2

(58) Field of Classification Search
USPC .................. 700/282; 123/200, 205, 206, 349, 123/350, 359, 445, 446, 495; 137/1, 2, 10, 137/15.01, 15.04, 15.08; 141/94; 340/438, 340/450, 450.2
See application file for complete search history.

(56) References Cited

U.S. PATENT DOCUMENTS

| | | | | |
|---|---|---|---|---|
| 3,387,404 | A | 6/1968 | Appel | |
| 4,079,719 | A | 3/1978 | Varcoe et al. | |
| 4,800,859 | A | 1/1989 | Sagisaka et al. | |
| 4,955,962 | A * | 9/1990 | Mell | 244/23 C |
| 5,488,933 | A * | 2/1996 | Pham | 123/531 |
| 5,638,803 | A | 6/1997 | Chang | |
| 6,025,784 | A * | 2/2000 | Mish | 340/693.5 |
| 6,405,744 | B1 * | 6/2002 | LaPant | 137/1 |
| 6,908,289 | B2 | 6/2005 | Scanderbeg et al. | |
| 7,159,578 | B2 * | 1/2007 | Horvath et al. | 123/518 |
| 7,455,052 | B2 * | 11/2008 | Yagisawa | 123/509 |
| 7,520,293 | B2 * | 4/2009 | Hilderley et al. | 137/202 |
| 8,055,526 | B2 * | 11/2011 | Blagg et al. | 705/7.14 |
| 8,205,331 | B2 * | 6/2012 | Braly | 29/888.011 |
| 8,249,907 | B2 * | 8/2012 | Blagg et al. | 705/7.21 |
| 8,255,168 | B2 * | 8/2012 | Lutnick et al. | 702/23 |
| 2003/0079800 | A1 * | 5/2003 | Nagao | 141/94 |
| 2010/0294777 | A1 * | 11/2010 | Jay | 220/562 |

* cited by examiner

*Primary Examiner* — Crystal J Barnes-Bullock
(74) *Attorney, Agent, or Firm* — David P. Lhota, Esq.; Lhota & Associates, P.A.

(57) ABSTRACT

A method and system is described for controlling an electrically driven fuel pump used in the filling of a hobbyist model craft's fuel tank, (airplane, car, boat etc). The system includes a microcontroller to control the direction and run time of a brushed electric motor-driven fuel pump. A calibration feature allows operating parameters for different sized pumps and tanks to be measured and recorded in memory, then later recalled and used in the filling of pre-selected models' tank to a predetermined level simply by pressing a button to initiate the operation.

9 Claims, 12 Drawing Sheets

Controller - Pump Setup

Circuit Diagram of the Model fuel Pump Controller

Auto start -Subroutine

Pump Calibration - Main

MODEL AIRPLANE AUTOMATIC FUEL PUMP CONTROLLER APPARATUS

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to an apparatus for use in hobby activities involving remote controlled vehicles that uses small internal combustion engines, and more particularly, to an apparatus to be used to control a brushed electric motor driven fuel pump to enable automatic and unattended filling or extraction of fuel from the vehicle's tank.

2. Description of the Background Art

Remote-controlled model aircraft, cars, and other vehicles have become very popular. These remote-controlled model vehicles commonly include an internal combustion engine for propelling the model vehicle. The craft is driven or flown by a pilot who uses an electronic transmitter to send encoded control signals to a receiver that is located inside the craft. These signals are decoded and sent to the appropriate servo mechanism to do the final control action.

The engine used in most cases, is a small internal combustion engine which uses a hydrocarbon liquid as the fuel and as such there is a tank in which an amount to last approximately 10-15 minutes while operating, is stored. Some modelers use a manual hand operated pump to get fuel into or out of the model's tank. In doing so the user generally counts the number of revolutions it takes to fill the tank from an empty state, therefore he has to count each turn his hand makes while filling the tank to get an estimate of the amount used in the previous flight. An overflow tube, attached to the tank, is constantly monitored to know when the tank is full. In most cases the fuel overflows before the pumping is stopped causing spillage and waste.

There are other modelers that use an electrically driven pump (12V) to fill and empty the tank. With such electrically operated devices and systems, the operator actuates a "Forward"/"Stop"/"Reverse" switch to pump fuel into the tank, stop pumping or remove fuel from the tank. Here the user also has to monitor the operation either by listening to the sound of the pump or the overflow to know when to stop the process. Conventional devices and systems using electrically driven pumps does not give the user any information to ascertain the amount of fuel left in a tank after a flight or drive. For instance, U.S. Pat. No. 5,638,803, issued to Chang, describes an oiling control device for remote control model engine oil tanks. Chang describes a method for the automatic filling of a model's fuel tank. This system uses a specially designed check valve, one that will allow air to pass both ways while allowing fuel in only one direction. This check valve is used to prevent fuel flow into the muffler during the filling operation while venting air from the tank. The system described by Chang relies on the effective operation of this check valve to prevent overflow, therefore any failure of the check valve will also result in a very imprecise or improper filling operation. Other fuel pumps and controllers known that fail to adequately and effectively address the foregoing issues include those disclosed in U.S. Pat. Nos. 4,800,859; 4,079,719 and 3,387,404.

The aforementioned prior art devices, systems and methods fail to give the user any information on the amount of fuel left in the craft prior to refilling. This is important as the operator either judges or times the flight duration so that the model does not run out of fuel during operation, resulting in a loss of power and possible damage to the craft as might occur when a sudden landing has to be made.

It can further be seen that conventional methods of filling tanks in fuel operated remote controlled craft result in some fuel being spilled on the ground. This waste precious fuel and leaves patches of damaged grass, especially if the fuel used is gasoline. It is also apparent that because the modeler has to be close to the model to monitor what is happening, he has to stoop or bend for the duration of the filling process as the model is usually close to or on the ground. This is not only uncomfortable and inconvenient but can result in physical injury to the operator.

Given the issues with conventional pumps, there exists a need for an automatic fuel pump for remote controlled toy vehicles operated with fuel, such as model airplanes. It is, therefore, to the effective resolution of the aforementioned problems and shortcomings of the prior art that the present invention is directed. The instant invention addresses this need by providing, without any special attachments, a convenient device, system and means for precisely filling a model craft fuel tank, to a predetermined level without such spills or even the need to monitor the process.

BRIEF SUMMARY OF THE INVENTION

In light of the foregoing, it is therefore an object of the invention to precisely fill a model craft's fuel tank to a predetermined level, regardless of whether fuel was previously in the tank or not.

It is another object of the invention to extract remaining fuel (on request) from the model's tank, then shutting down on completion.

It is another object of the invention to display the amount of fuel that was in the tank prior to starting either the fill or extraction process.

It is another object of the invention to be able to fill or extract fuel from the tank in either a manual or automatic mode.

It is another object of the invention to stop the filling or extraction process if the source of fuel goes empty.

It is another object of the invention to be able to calibrate different pumps and store their operating parameters in memory for later use.

It is another object of the invention to be able to calibrate and record, the fill and extraction parameters for many different size fuel tanks.

It is another object of the invention to enable each unit to be used with many different models, by recording model names or number, along with the parameters for the pump and tank calibration data for each model.

It is another object of the invention to audibly report errors or signal operation completed using a beeper to get the user's attention.

It is another object of the invention to employ user friendly software, giving assistance at all stages indicating to the user, available options and explanations of the present operation being done.

In accordance with the present invention, there is provided an apparatus consisting of an electronic circuit and software within a micro controller chip, which can be housed in a small hand held enclosure or mounted in a control panel. The apparatus is preferably supplied with an external source of electrical power (12 Vdc) and further connected to the fuel pump that it controls.

The controller accepts user inputs from switches and runs the pump in the appropriate direction to fill or extract fuel from the tank. The pump to be used and the tank to be filled can be calibrated and the resulting parameters stored in memory.

These parameters are recalled when needed and used by the controller to precisely fill the tank to a predetermined level regardless of whether fuel was previously in the tank or not.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE INVENTION

With reference to the drawings, FIGS. 1-12 depict the preferred embodiment of the instant invention, which is generally referenced as a fuel pump controller or controller apparatus or system and, or by numeric character 5. Reference will now be made to FIGS. 1-12 in which the various elements of the preferred embodiment of the present invention 5 will be given numerical designations, and in which the preferred embodiment of the invention will be discussed so as to enable one skilled in the art to make and use the invention.

Figure 1:
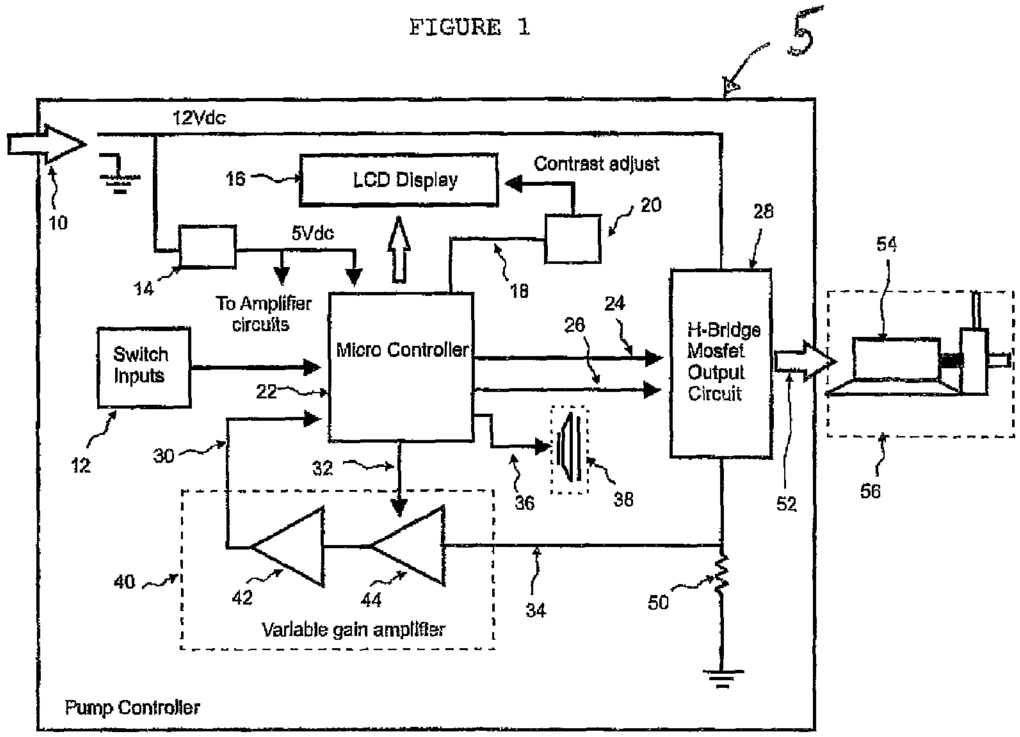
FIG. 1 is a block diagram of the pump controller in accordance with the preferred embodiment of the instant invention.

With reference to FIG. 1, the model fuel-pump controller 5 is powered by an external power source 10 that supplies the correct voltage and current to operate the brushed motor 54 driven fuel-pump 56 (herein referenced as "fuel pump 56"). In the preferred embodiment of the invention, the fuel pump 56 is external to the controller 5 and connected to the pump controller 5 by a flexible wire. In another embodiment of the invention, the controller 5 and the fuel pump 56 may be encased in a single unit. In yet another embodiment, the power source, the controller 5 and the fuel pump 56 may all be encased in one enclosure.

The fuel-pump controller 5 comprises circuitry, as shown in FIGS. 2-5, which uses and requires a lower voltage than the voltage required by the fuel pump 56. Accordingly, the circuitry of the controller 5 comprises a 5V regulator 14, preferably of the type LM78L05, to adjust the provided voltage to the 5 volts required by the circuitry.

The microcontroller 22 accepts user key press or other tactile inputs from the user interface, which displays information and readings on a LCD display 16 in accordance with the user inputs. The information presented to the operator or user includes information for assistance (help) and data pockets showing what is happening in terms of the control actions and calibration procedures, as well as parameters, time delay values obtained during calibration and countdown time values, while operating.

Referring to FIG. 1, the fuel pump 56 is controlled by the microcontroller 22 via an H-Bridge output controller 28 with a Mosfet (metal oxide field effect transistor) setup. The motor 54 draws current that flows through a current sense resistor 50 that produces a current sense signal 34 in the form of a small voltage. This voltage is amplified by a factor as set by the gain control signal 32 from the microcontroller 22. The amplified current sense output is then fed to the microcontroller 22 where it is converted to a digital count representative of the inputted signal. This digital current value is monitored at various times in the operation and used along with calibration values to fill and extract fuel from a tank 7.

Figure 2:
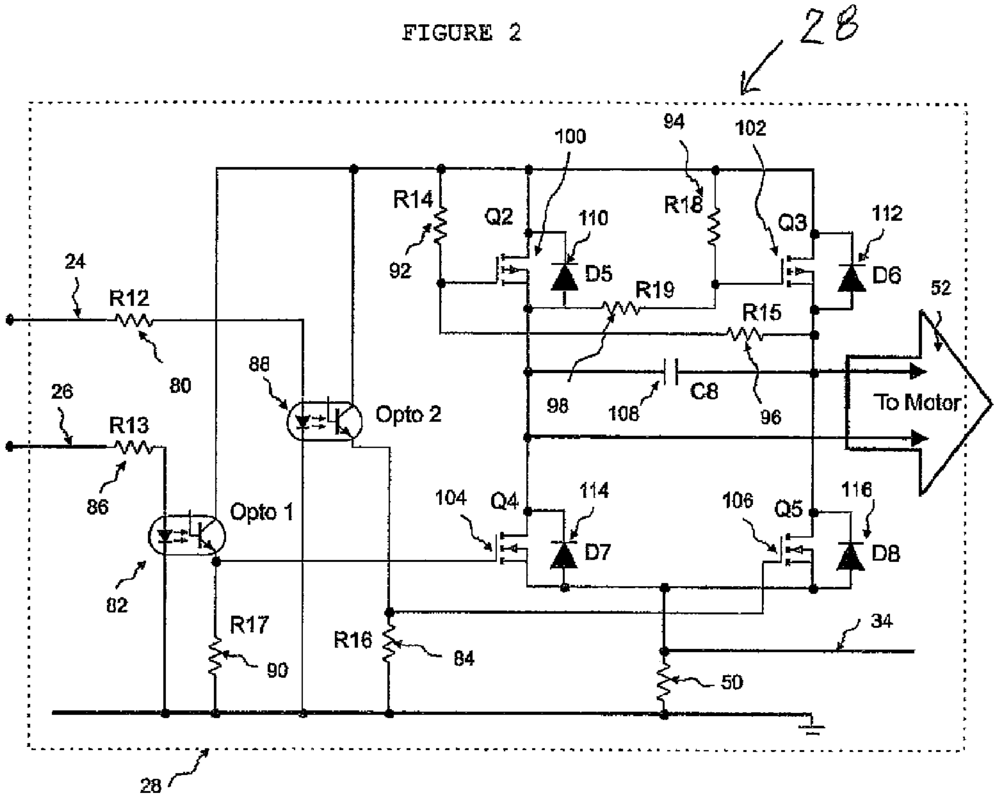
FIG. 2 is a circuit diagram of the h-bridge Mosfet circuit of the pump controller in accordance with the preferred embodiment of the instant invention.

With reference to FIG. 2, the microcontroller 22 and the H-Bridge output controller 28 are isolated from each other by Opto couplers, Opto1 88 and Opto2 82, due to the different voltage levels involved. The H-Bridge output controller 28 uses two "N" type, Mosfet Q4 104 and Mosfet Q5 106 in the lower half of the bridge, and two "P" type Mosfet Q2 100 and Mosfet Q3 102 in the upper half, which allows the driving of the Mosfets from the voltage provided by the power supply, without the need for special drivers to turn on the upper Mosfets, fully. When switched on, the Mosfets offer very little resistance to the flow of current that passes through them, and the motor 54. In fact, the Mosfets chosen are ones having very low on resistance (low RDS), allowing large current flows with very small voltage drop across them, the circuit can therefore adequately supply the current to the motor 54 with very little heating of the drive Mosfets, allowing for a very efficient operation. In an alternative embodiment of the instant invention, the controller 5 may use four N-Type Mosfets to control the motor 54 by using the appropriate mosfet drivers to provide the correct gate drive voltage and current. In another embodiment, Mosfets could also be arranged electrically, in parallel to achieve much higher current handling capabilities, It is also possible to use higher supply voltages with larger pumps supplying much larger quantities of fluid for application outside the modeling fraternity.

To run the fuel pump 56 in the forward direction, the microcontroller 22, raises the fill signal 24 output to a high level, i.e. 5 volts. This turns on the led and transistor within the opto isolator Opt2 (88), via current limiting resistor R12 (80), causing the voltage applied to the gate of the Mosfet Q5 (106) to be raised to near the supply level, which turns on Mosfet Q5 (106), fully. This in turn, causes the gate of Mosfet Q2 (100) to be brought to near ground potential through resistor R15 (96), turning it on fully as well.

Running in the reverse direction is achieved similarly by raising the extract signal 26 line to a high level (5V). This turns on the led and transistor within the opto isolator Opt1 (82), via current limiting resistor R13 (86), causing the voltage applied to the gate of the Mosfet Q4 (104) to be raised to near the supply level, which turns on Mosfet Q4 (104) fully. This in turn, causes the gate of Mosfet Q3 (102) to be brought to near ground potential through resistor R19 (98), turning it on fully, which allows current flow in the opposite direction through the motor 54.

Still referring to FIG. 2, diode D5 (110) through diode D8 116 protects the Mosfets from dangerous back EMF whenever the motor 54 current is turned off. These protective diodes are often built into the power Mosfets. Resistor R16 (84) and resistor R14 (92) are used to ensure the Mosfet Q5 (106) and Mosfet Q2 (100) stays off when the fill signal 24 line is low or off, likewise Resistor R17 (90) and resistor R18 (94) are used to ensure the Mosfet Q4 (104) and Mosfet Q3 (102) stays off when the extract signal 26 line is low or off.

Figure 3:
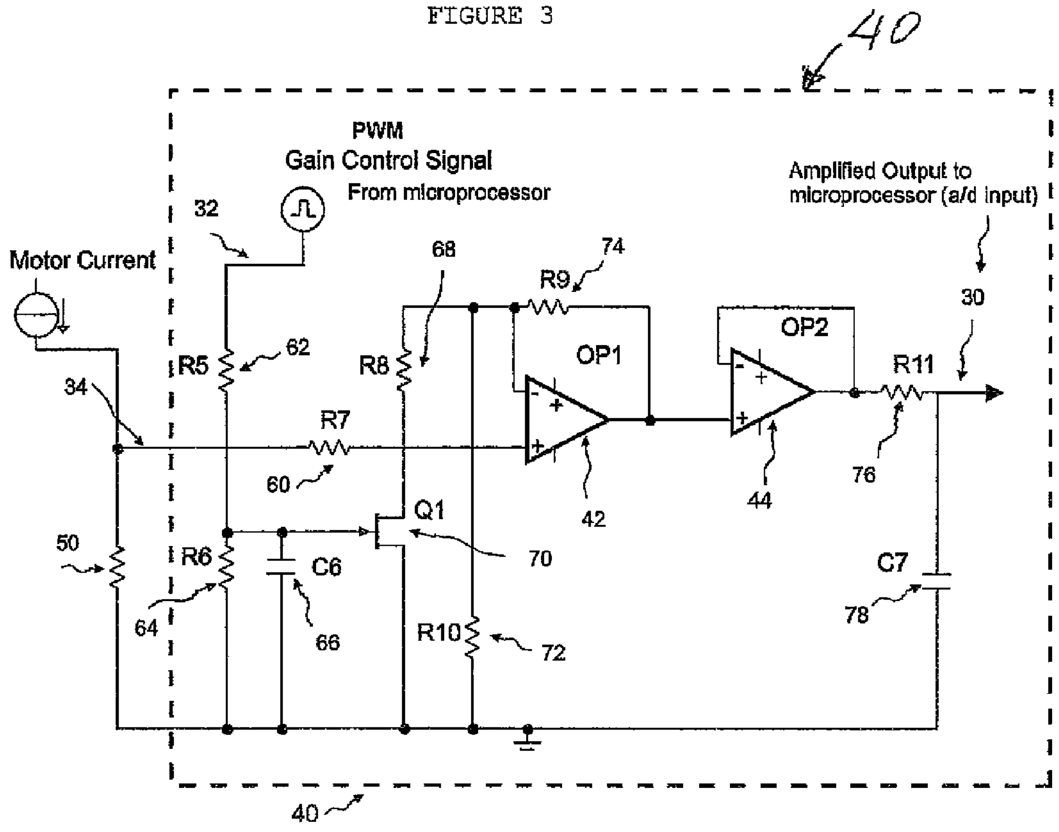
FIG. 3 is a circuit diagram of the current sense and variable gain amplifier of the pump controller in accordance with the preferred embodiment of the instant invention.

With reference to FIG. 3, the gain of the operational amplifier Op1 (42) is set by the gain control signal 32 from the microcontroller 22. The gain control signal 32 is a pulse width modulated (PWM) waveform generated by the microcontroller 22 and fed to resistor R5 (62), resistor R6 (64) and capacitor C6 (66), which forms a DC filter 20. The output of the filter 20 sets a bias voltage to the gate of the FET 70 (field effect transistor) so that it operates in the linear region of its operating characteristic curve. The effect of this is that it appears as a linear resistance in series with resistor R8 (68). The gain of the amplifier is determined by the value of the feedback Resistor R9 (74) divided by the series, parallel combination of the FET 70, resistor R8 (68) and resistor R10. The value of resistor R8 (68) actually sets the maximum gain when the resistance of the FET 70 is at its lowest, while resistor R10 sets the minimum gain when the resistance of the FET 70 is at its highest.

Referring to FIGS. 2 and 3, the current that passes through the motor 54 also passes through the current sense resistor 50, which comprises either a very low value resistor or simply a length of the PCB (printed circuit board) copper track, etched in such a pattern so that it is about six inches long and wide enough to handle the motor 54 current flowing through it. A low value is used so as to not create any substantial voltage drop that would reduce the effective voltage applied to the motor 54, thereby affecting its performance. The small voltage or current sense signal 34, developed across this current sense resistor 50, being proportional to the current flowing through it, is fed to the operational amplifier (Op1 42) via resistor R7 (60) and multiplied by the gain factor as set by the microcontroller 22. The gain factor is derived during the calibration of the fuel pump 56. The resulting amplified voltage is then buffered by a second operational amplifier Opt (44) and filtered by resistor R11 (76) and capacitor C7 (78), before being passed to the analog to digital (aid) input of the microcontroller 22 where it is converted to a digital value and kept for use in internal processing.

Figure 4:
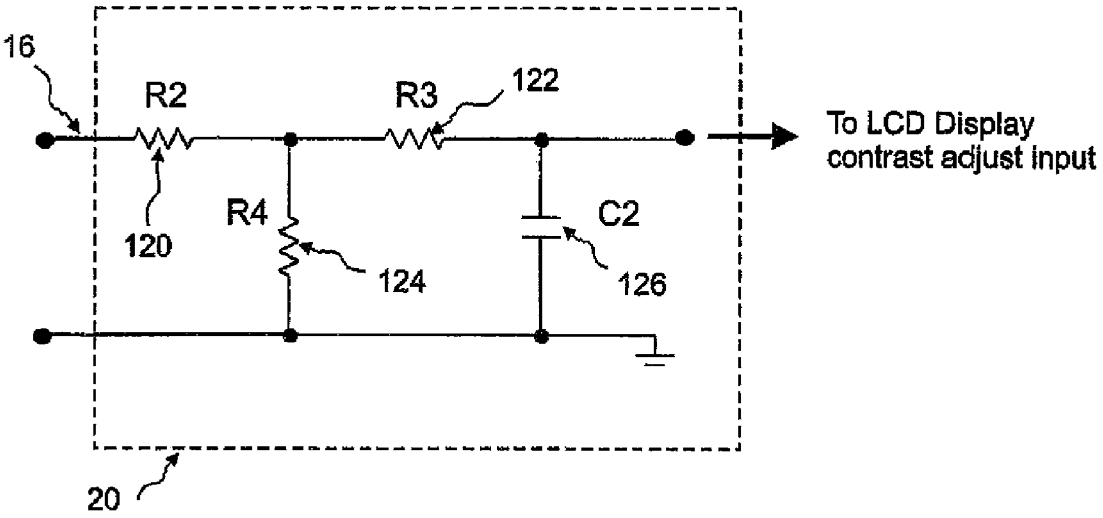
FIG. 4 is a circuit diagram of the PWM to dc voltage level filter of the pump controller in accordance with the preferred embodiment of the instant invention.

With reference to FIG. 4, the contrast of the LCD display 16 is programmed to be adjustable by the user to allow comfortable viewing of the displayed information. This is achieved, as shown in FIG. 4, by using a PWM signal generated by the microcontroller 22. This PWM signal, also referred to as the LCD contrast signal 18, is applied firstly to a voltage divider comprising resistor R2 (120) and resistor R4 (124), then to a low pass filter 20 comprising resistor R3 (122) and capacitor C2 (126), before being passed to the contrast control adjustment input of the LCD display 16. By varying the "on time" of the LCD contrast control signal in the software, the average voltage applied to the LCD contrast input will vary, thereby adjusting the contrast level.

With reference to FIG. 1, an audible beeper 38 is driven by a beeper signal 36 from the microcontroller 22. This beeper signal 36 and beeper 38 are provided to alert the user of any error that might occur during operation and also to indicate that an automatic operation has completed.

Figure 5:
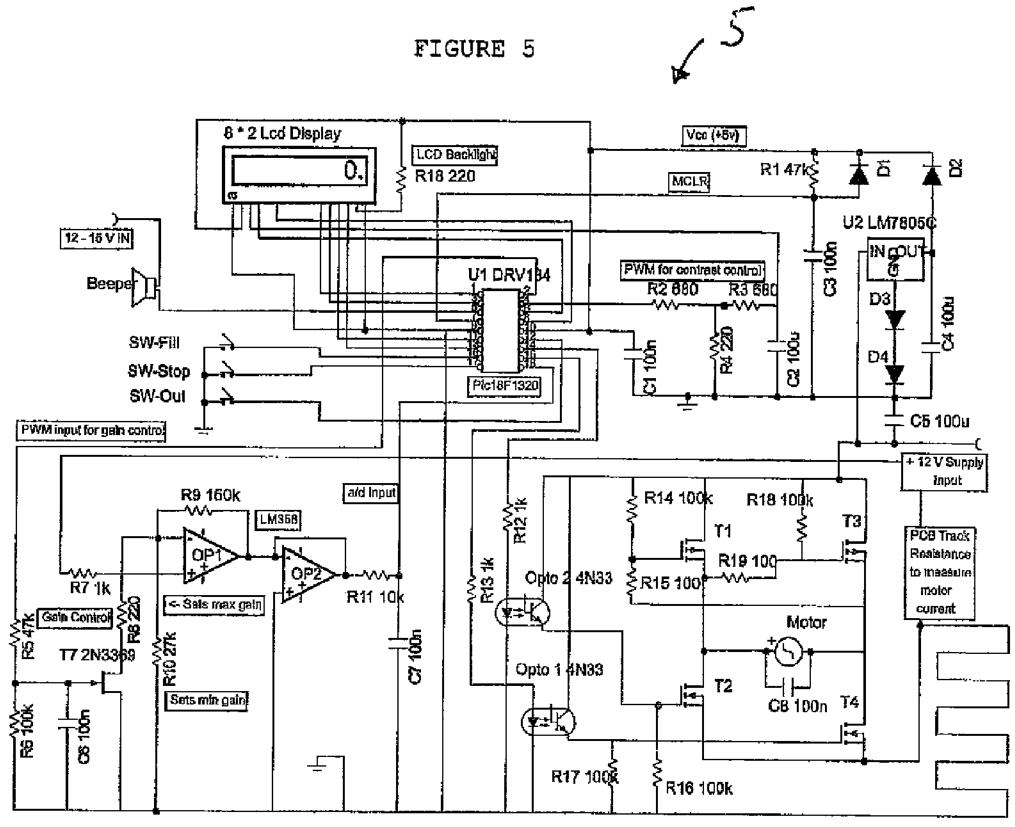
FIG. 5 is a complete circuit diagram of the pump controller in accordance with the preferred embodiment of the instant invention.
Figure 6:
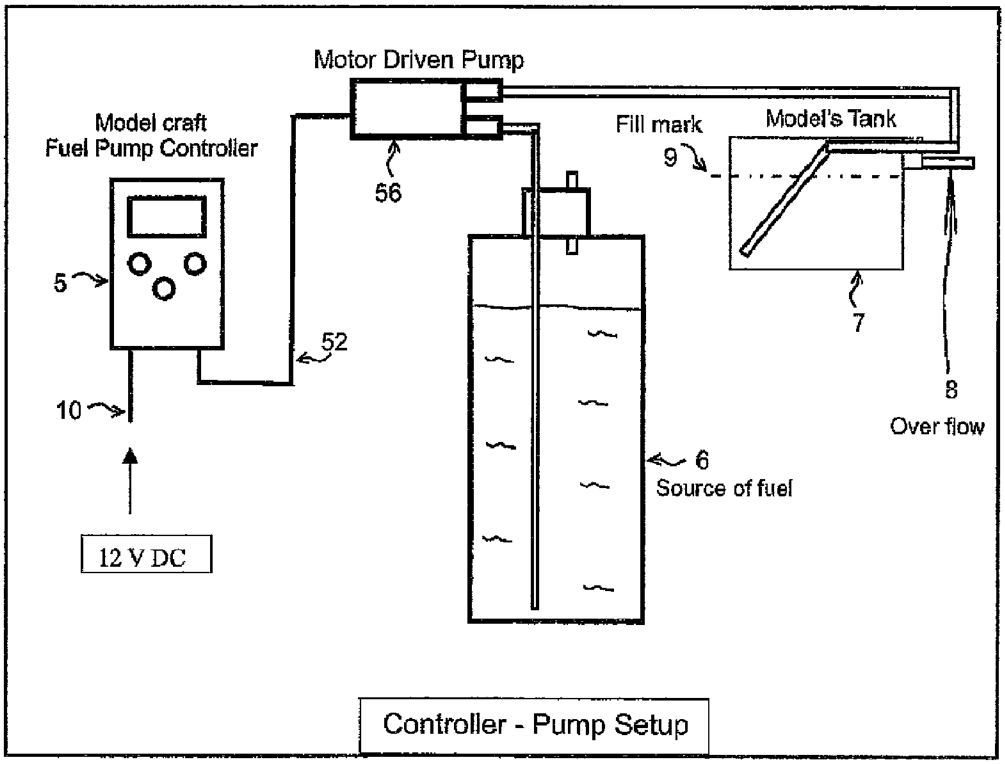
FIG. 6 is a model craft fuel pump controller system setup employing the pump controller in accordance with the preferred embodiment of the instant invention.

With reference to FIGS. 5-6, a complete circuit diagram of the preferred embodiment of the fuel pump controller 5 and system application of the instant invention is shown. FIG. 5 illustrates all the components of circuit of the controller 5. FIG. 6 illustrates a practical setup for the model fuel pump controller 5 in a system for performing fuel pump 56 and, or tank 7 calibration procedures and filling or extracting fuel from a model craft's fuel tank 7.

Figure 7:
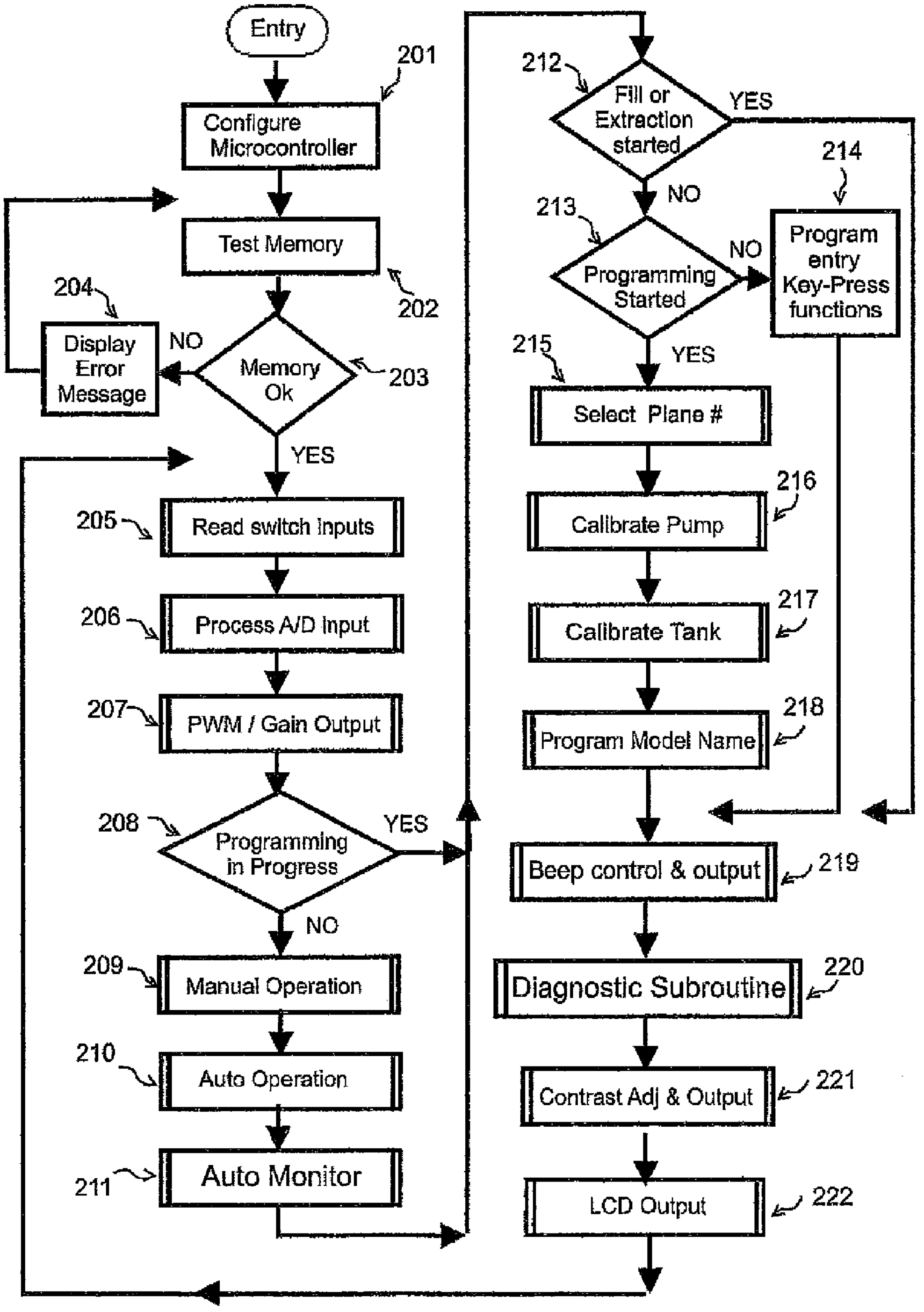
FIG. 7 is a flow diagram view of the logic of the main program and its subroutines run by the pump controller in accordance with the preferred embodiment of the instant invention.

With reference to FIGS. 7-12, the process of the instant invention 5, including the operation of the program instructions contained within the microcontroller 22 that enables it to do all the functions of the preferred embodiment of the invention, are shown and explained below with references being these figures. Referring to FIG. 7, the main routine starts with power-on reset at 201 where the microcontroller 22 sets all outputs off, configures all its internal operations and peripherals such as timers, interrupts, analog converter and pulse width modulators (PWM). It also test its internal random access memory (Ram) 202. If this test fails, the main program execution will be diverted back to step 202 after a report 204 is given on the LCD display 16 to this effect. If the test is passed, the program moves on to the subroutines dealing specifically with individual operations as discussed further herein.

Referring to FIG. 7, at subroutine 205 all switch inputs are read from the user interface and de-bounced to ensure a single input for each single switch press, then stored in RAM for use when required. In subroutine 206, the microcontroller 22 performs an analog to digital (a/d) conversion of the analog voltage outputted by the variable gain amplifier. This voltage is determinative of the current flowing through the motor 54 and is presented to the A/D input of the microcontroller 22. On completion of the conversion, this digital value is stored in memory for later use. At subroutine 207, the microcontroller 22 uses the gain value that is stored in electrically erasable programmable read only memory (EEPROM or eeprom) to set the duty cycle of the PWM controller and outputs the PWM waveform, as the gain control signal 32 at that point in time. This gain value is determined from the calibration of the fuel pump 56, and if not yet calibrated, a default value would be used. The program flow continues to decision step 208, where the operation is directed to either the operating mode or the calibrating mode. Whichever mode is active will prevent entry into the other mode, which ensures that calibration cannot be attempted while filling or extracting fuel and vice versa. With respect to manual operation, subroutine 209 monitors the user's key press activity. If the auto operation is not in progress and there is a request for either a manual fill or extraction, the fuel pump 56 will run in the direction as requested. At that point, the fuel pump 56 can only be stopped manually by the user or by the monitoring of the current for a no load situation. The display will indicate the action taken or the cause of any error.

Figure 8:
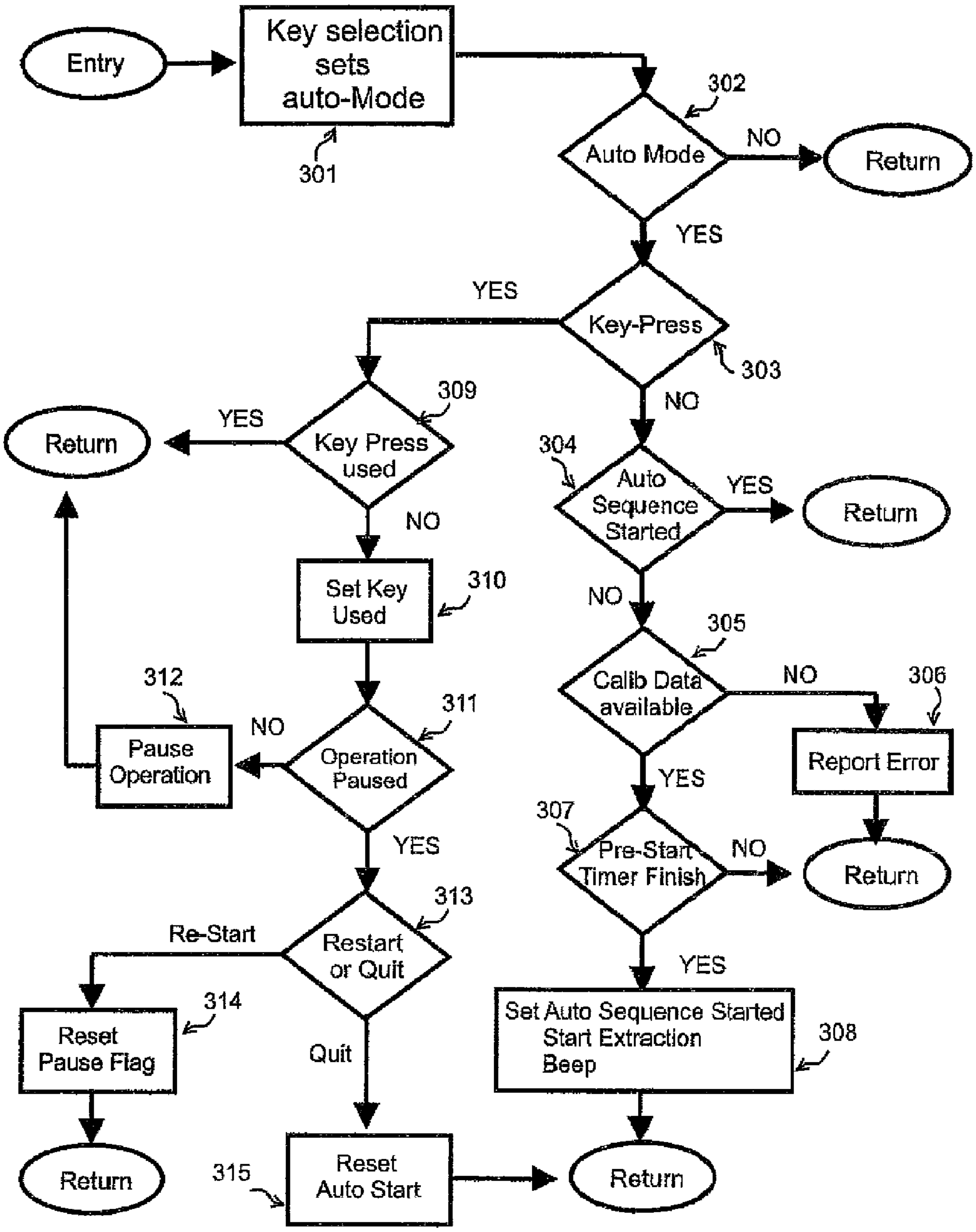
FIG. 8 is a flow diagram view of the logic of the auto start subroutine run by the pump controller in accordance with the preferred embodiment of the instant invention.

Still referring to FIG. 7, in the operating mode the subroutine 210 responds to all user initiated requests or actions through the user interface with regards to the automatic filling and extraction of fuel from the tank 7. This program flow is as directed and shown by the logic flow charts of FIGS. 8 and 9. Referring to FIG. 8, the initial auto entry setup is shown, where after the auto mode is set (step 301), and the key switch is released, decisions steps 302 and 303 will allow the program flow to go to step 305 where the calibration data will be checked. If no calibration data is available, then an error is reported in step 306. If conditions are acceptable, a short delay is started, and checked for completion at step 307, before the actual automatic sequence is started step 308. During this delay, the request can be cancelled before the fuel pump 56 starts. At step 308, the extraction of fuel is started and a flag is set to indicate this. From this point forward, this subroutine continues to monitor the inputs (step 303) from the user interface, to determine if there is a request to pause the process, which will be done at step 312. If it is already paused, a decision step 313, will be made to quit or restart the auto operation, while control of the fuel pump 56 is passed to the auto monitoring subroutine of FIG. 9.

Figure 9:
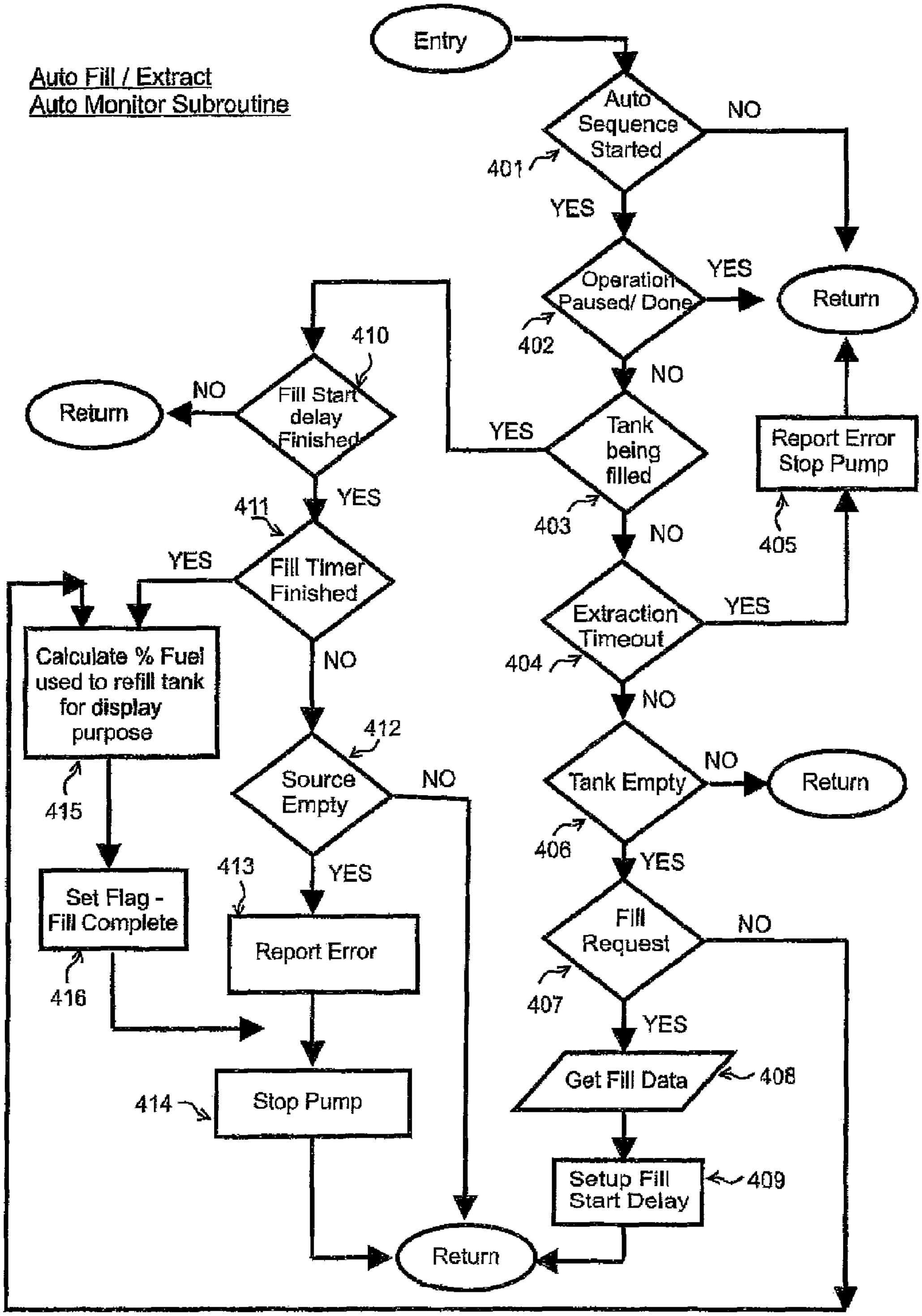
FIG. 9 is a flow diagram view of the logic of the auto monitor subroutine run by the pump controller in accordance with the preferred embodiment of the instant invention.

With reference to FIG. 9, the subroutine 211 is shown. Step 401 checks if the auto sequence has started. If not, the subroutine is exited. Otherwise the program goes to step 402 where a check is made to determine if the auto process has been paused. If true, the program exits the subroutine. Otherwise the program flow continues to step 403 where a check is made to determine if the tank 7 filling has started. If it has not started, then another check step 404 is done to find out if an extraction time out has completed. This timer is introduced to report an error (step 405) in the event the extraction process takes excessively long to remove all fuel in the auto mode. The time used for this timer could be about thirty percent longer than the calibrated extraction time. If the decision is negative at step 404 then the current level is checked at step 406 to determine when the tank 7 goes empty. When this condition at step 406 becomes true the program now checks if the original user request, was to fill the tank 7 (step 407), if no, the program goes to step 415 where the amount of fuel used is calculated and displayed as a percentage, (ie. 100% less the % extracted), the program will then shut down the operation and revert to the standby mode.

If at step 407, the original request was to fill the tank 7, the program will continue to step 408 where the fill time for this tank 7 will be retrieved from memory, a short delay step 409-410 will allow the fuel pump 56 to stop before changing its direction to start the filling process and the fill timer which will count down. This timer will be tested for its completion at step 411, and if it is still not done, the program will be directed to step 412 to check the motor 54 current, if it goes low (no load) an error will be reported, indicating that the fuel source 6 is empty (step 413), the operation is then stopped at step 414. If the fill time runs to the end (step 411), without any low current error, the fuel pump 56 is stopped and the amount of fuel used to fill the tank 7 less that which was extracted is calculated and displayed as a percentage, step 415.

With reference to FIG. 7, Step 212 is a decision which allows the program flow to continue to the calibration entry subroutines if neither the auto or manual operations were running, if either is running then the flow will be redirected to subroutine 219, thereby bypassing the user calibrating mode. If the program is directed to step 213, a decision is made to determine if the calibrating mode has already started, if no, the program will monitor and determine if the key press sequence request a calibration entry, step 214 then continue to the beeper 38, subroutine 219. If the calibration entry gets set at step 214, then, in next pass the program flow will be directed to subroutines 215-218 (the calibration). Here the user would select one of four calibration functions and the respective subroutine would then allow entry to that function. Subroutine 215, if selected, allows a simple selection of the model number, each Model Fuel-Pump 56 Controller can be used on many different models, having different size fuel tanks as well as requiring different types of fuel pumps. The number is an "ID" for each model and is used in the retrieval of calibration data, for use in the auto filling process or during the calibration. When this model number is selected, it becomes the current model and its calibration data will be used if available or if further calibrations are done, these new data will be stored for this model. An alphanumeric name can also be used instead of a model number.

Figure 10:
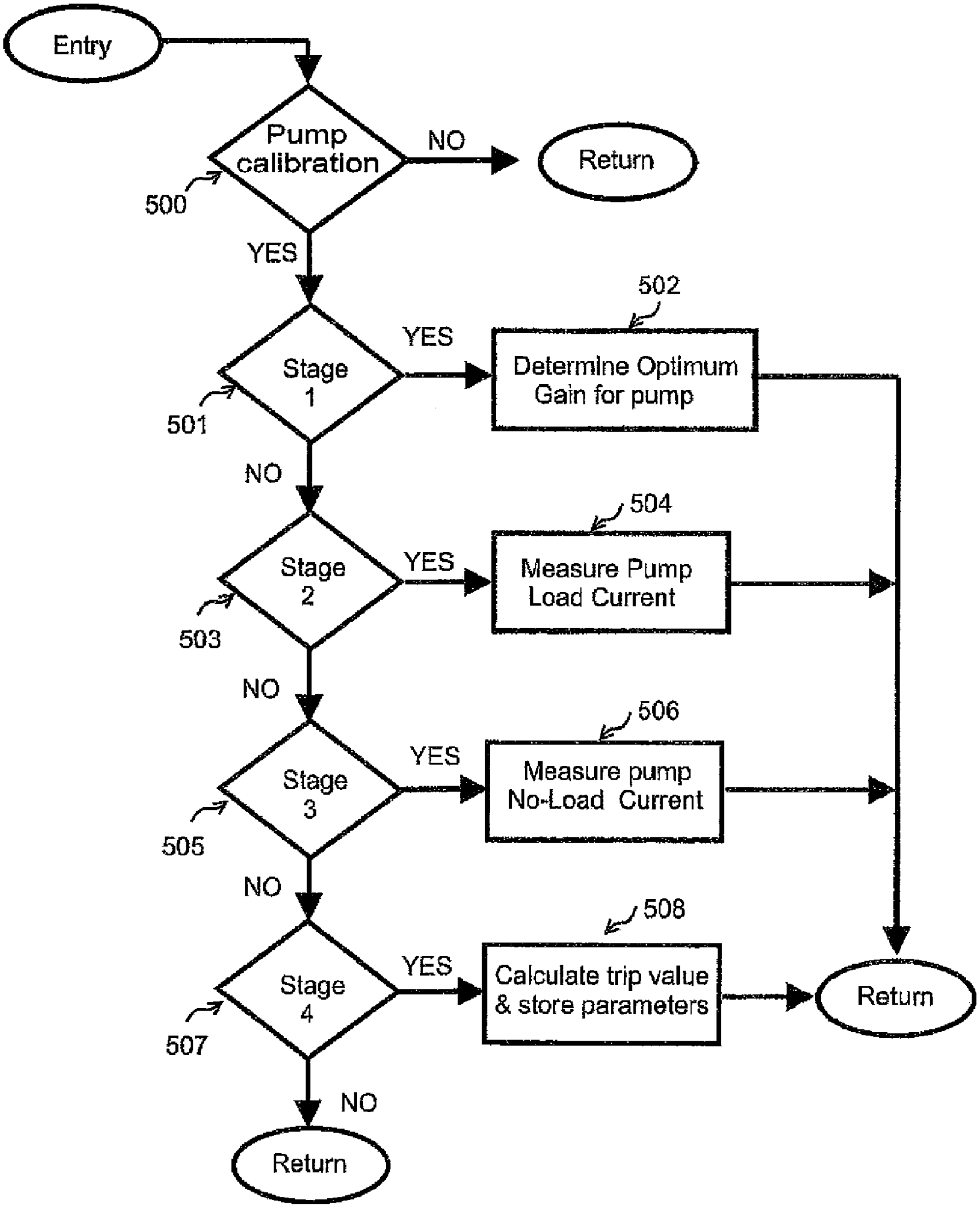
FIG. 10 is a flow diagram view of the logic of the pump calibration—main subroutine run by the pump controller in accordance with the preferred embodiment of the instant invention.

The calibrate fuel pump 56 selection allows entry into the subroutine 216 of FIG. 7. Here the user only needs to initiate the calibration process. The subroutine has four stages as shown in FIG. 10, once started the process goes through each stage of the calibration automatically, firstly running the pump 56 in the reverse direction to remove any fuel that might be in the tank 7, then change the direction to deliver fuel from the source to the tank 7. This time, measuring the current being used while adjusting the amplifier's gain to get an acceptable digital representation of the current. When this adjustment is completed the pump 56 will again change direction, now pumping the fuel from the tank 7 back to the source until the tank 7 is empty. When the calibration is finished, the display will indicate the parameters determined. The user will be shown the results and given the option to save them. The decisions at steps 501, 503, 505 and 507 determine and direct the program flow to do these specific tasks during the calibration of the fuel pump 56. A stage counter is advanced at the end of each procedure to enable moving on to the next stage until all are completed.

Figure 11:
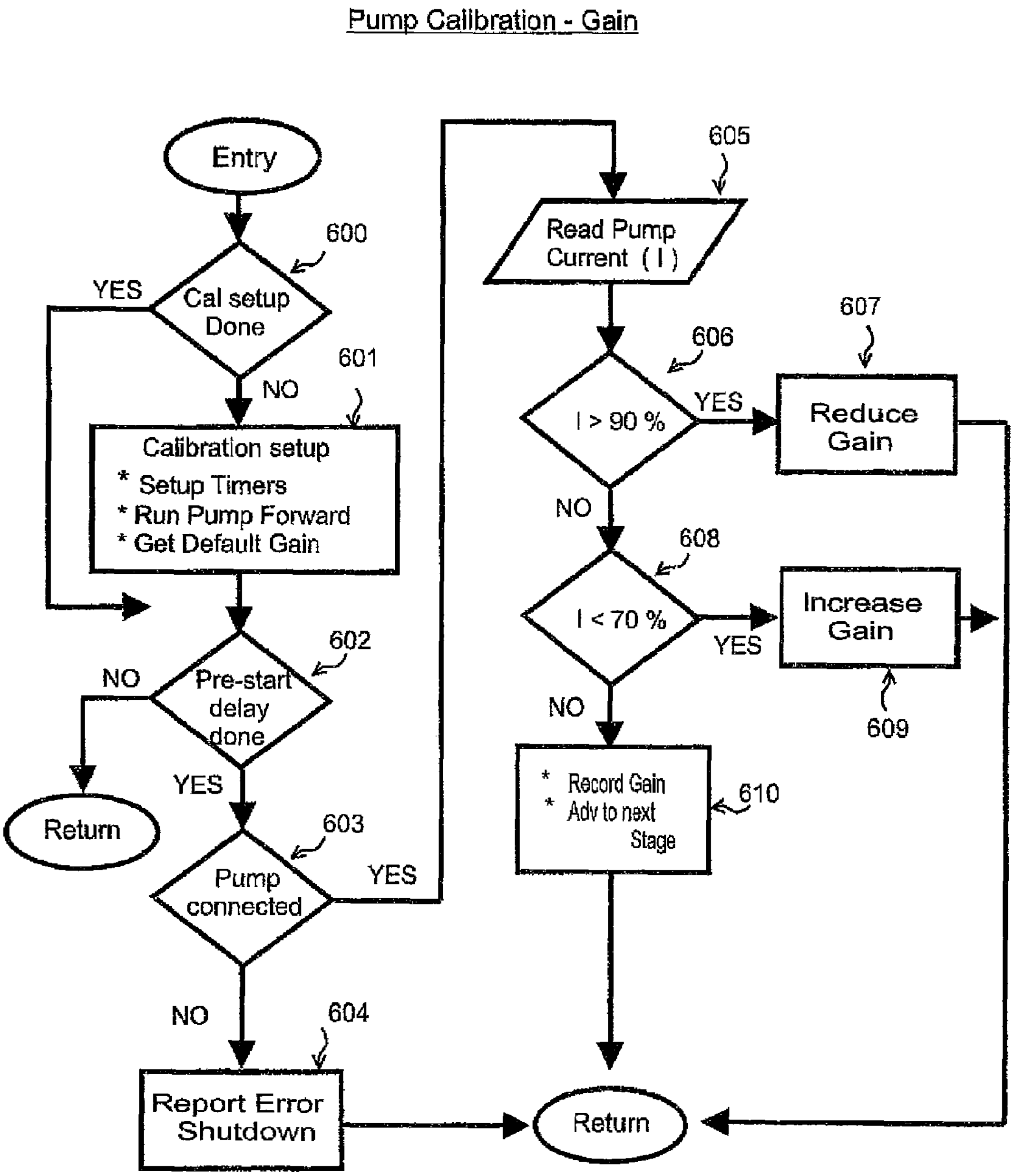
FIG. 11 is a flow diagram view of the logic of the pump calibration—gain adjustment subroutine run by the pump controller in accordance with the preferred embodiment of the instant invention.

With reference to FIG. 11, there is a flow chart showing the procedure involved in determining the appropriate gain of the amplifier, so that the result of the aid conversion (current measurement), will be a nominal value of about 80% of the full aid range for whichever fuel pump 56 that is connected to the unit. On entry into the subroutine, a decision at step 600 is done to determine if this is the first time into the routine, if so the initial calibration setup is done using, a default gain value, setting timer variables and starting the fuel pump 56 in the forward direction. After a pre-start delay 602 of about 2 seconds, the aid current value is tested at decision step 603 to determine if the fuel pump 56 is connected or not, if no, an error will be reported while shutting down the process, if a current is measured the program advances to step 605, where the current reading is again captured, then compared with a high limit of 83% of the maximum 10-byte value (3FF Hexadecimal or 1023 decimal), at decision step 606. If the measured current is higher, the program branches to step 607 where the gain value is lowered, this new gain value will be outputted at subroutine 207 of FIG. 7, during the next pass. This reduction and outputting of the gain value continues until decision step 606 sends the program to decision step 608, where the low gain adjustment is done. Decision 608, checks if the current measured is lower then 78% of the maximum 10-byte value, if so, the program will be sent to step 609 to increase the gain until the current is above the low limit. When the appropriate gain is found that causes the aid current value to be within the 78 to 83% of the maximum 10 byte value, the process will be allowed to go to step 610 where the new gain will be stored in buffer, the calibration stage count will now be advanced to the next.

In the second stage, as shown in FIG. 10, step 503 sends the program to step 504, where the fuel pump 56 is allowed to continue running and pumping fuel for another 2 seconds, to achieve a steady current at the new gain setting, after this delay the current is measured and stored in the buffer as the load current, step 504, ending with the stage count being advanced again. In the next stage, Step 505, the program is directed to measure the no-load current, step 506, where the fuel pump 56 is firstly stopped and after a short delay, it is reversed to remove all fuel from the tank 7. The current is monitored to determine when it falls to a much lower level (fuel pump 56 running freely). At this point there is another delay to ensure that this lower current becomes stable, after which a reading will be taken as the no load current and recorded in buffer, advancing to the next stage.

In decision step 507, the program is directed to step 508 where the results obtained are used to calculate a trip value using the formulae:

$$\text{Trip}=Lc+(Hc-Lc)*0.66$$

Trip=the dividing point or value between load and no load operation

Lc=Low current—(no load)

He=High current—(load)

This trip value is used in the auto manual operation to determine whether the fuel pump 56 is running with or without load, even if the motor's operating currents should vary somewhat from the values obtained during the calibration. The load and no load currents are also compared with each other to ensure that there is a large enough gap between them both, and if not, this will be reported as a calibration error. If all conditions are ok, the resulting calibration values are displayed and the option is presented to the user, to save or discard the results.

Referring to FIG. 7, subroutine 217 is the tank 7 calibration, where the microcontroller 22 determines the length of time taken to fill the tank 7 from an empty state and also to empty the said tank 7 from the newly calibrated level.

Figure 12:
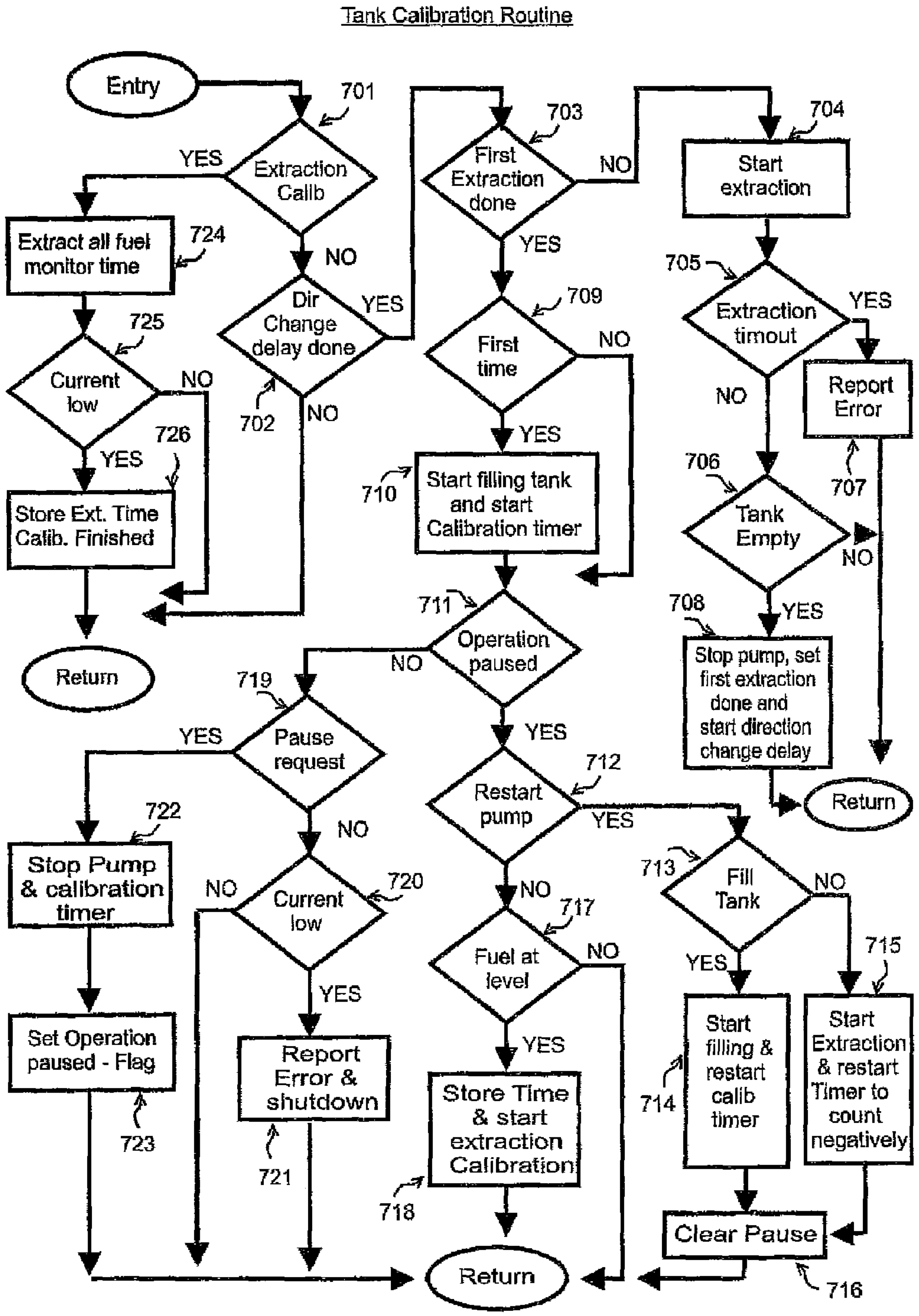
FIG. 12 is a flow diagram view of the logic of the tank calibration subroutine run by the pump controller in accordance with the preferred embodiment of the instant invention, For purposes of clarity and brevity, like elements and components will bear the same designations and numbering throughout the Figures.

With reference to FIG. 12, step 701 is shown, which is the entry point where a decision is made as to whether the extraction calibration is being done or not. At the start of the calibration this will be false causing the program to go to step 702 where a decision will be made to determine if the fuel pump 56 direction change delay has finished. This timer would not be running therefore the program will move on to step 703 to check if the first extraction has been done. If no, the program will go to step 704 where the fuel pump 56 will be started to remove any fuel that is in the tank 7. This will continue unless stopped by the user, the extraction time-out, step 705 or the tank 7 level going low, no load current step 706. The user and time-out stop will cause an error report (step 707), while the low level stop, being a part of the procedure will set the first extraction complete flag and start the fuel pump 56 direction change timer, step 708.

On the next entry into the subroutine, the program will keep exiting the subroutine until the delay step 702 has expired, again sending the program to step 703 where the decision will now be true and the program will go to step 709. Here a check is made to determine if this is the first time into this section of the routine, on the first entry the calibration timer as well as the fuel pump 56 will be started to fill the tank 7. Step 711 now check if the operation has been paused by the user, if this is negative the program moves on to check for any user request to pause the calibration, step 719 where the fuel pump 56 and the calibration timer will be stopped at step 722 or if there is no pause request, then the program will check for a low current situation, step 720, to stop the process and report this as an error (fuel source 6 low) step 721. If at step 711, the decision showed that the process had been paused, then the program would go to step 712, a decision, checking if there is a new request to restart the calibration process, if true decision step 713 will determine in which direction to run the fuel pump 56, as the user can now select fill to add more fuel to the tank 7 or extract to remove fuel from the tank 7, This situation could arise if the level had passed the desired stopping point or fill mark 9 on the tank 7, the user is then be allowed to remove or add fuel until the desired level is achieved, without affecting the accuracy of the calibration time obtained. Steps 714 or 715 will therefore run the fuel pump 56 in the appropriate direction and start the calibration timer to either count up or down according to the choice, as well as removing the pause condition, step 716.

At step 712, if the decision was not to restart the fuel pump 56, the program will be directed to step 717 where a decision will be made to determine if the user wishes to end the filling, if negative the program will leave the subroutine, otherwise if yes, the calibration fill time obtained will be stored in buffer at step 718, and the tank 7 calibration process advanced to the extraction calibration stage.

On re-entry into the subroutine step 701, the result of this decision will now route the program to the extraction calibration step 724, where the fuel pump 56 will be started to extract all fuel from the tank 7 while monitoring the current (step 725) to determine when the tank 7 goes empty. The time taken to extract the fuel will also be measured, for later use in calculating the amount of fuel used in the auto manual operation. This extraction time is found to differ from the fill time due to hydrostatic pressure differences as the tank 7 and the fuel container are usually at different elevations. When the tank 7 goes empty, step 725, the program will be directed to step 726 where the results are then displayed while the user is given the option to save or discard them. Subroutine 218 allows the user to enter and store an alphanumeric name for each model as mentioned earlier. This ends the user calibration.

Subroutine 219 looks at all error conditions and operations completed to provide audible beeps either as a warning or a signal indicating that a request was carried out. This routine also produces a beep in response to inputs from the user interface.

Subroutine 220 is a basic diagnostic routine to allow the user to view the calibration parameters of the pump 56 as well as the present a/d value being measured. Here the fuel pump 56 can be run manually in either direction, therefore the user can view the present a/d conversion value of the current passing through the motor 54.

Subroutine 221 monitors the key switch inputs for a user request to adjust the contrast of the LCD display 16, when this mode is entered, pressing one button will adjust the value of a memory variable upwards, while pressing another will adjust its value down. This variable is used to determine the duty cycle of the PWM signal, that is, the ratio of the outputted waveform's on time to its off time, in a preferred embodiment this second PWM signal is generated in software using an interrupt to maintain a stable PWM frequency during which time the on/off duty cycle is adjusted. In another embodiment, this PWM signal can be generated by hardware in the microcontroller 22, as is done with the gain PWM. During the adjustment of the contrast variable, the PWM signal outputted also changes accordingly, so that the actual contrast of the display changes simultaneously. When the desired contrast is achieved the new value is stored in eeprom so it will be available at the next startup.

Subroutine 222 is the LCD display 16 program steps necessary to send data to the display module as per its specification. After completing subroutine 222, the program returns to step 205 where the cycle is repeated continuously until powered down.

With reference to FIG. 6, in operation the current used by the motor 54 which drives the fuel pump 56 is noticeably lower when the fuel pump 56 is running without load as opposed to when it is running with a load. These current levels are measured and recorded during the calibration stages and are used to determine a suitable trip point of load or no load operation.

This trip value is used in the fill or extraction process to determine when the fuel source 6, from which fuel is being fuel pumped is empty. In filling the tank 7, it is then a simple task to always ensure that the tank 7 is empty by removing all fuel from it, then refilling it using the pre-recorded calibration time stored in memory for this model. The extraction of fuel as stated above is also timed and compared to a pre-recorded calibration extraction time, to produce and display the amount of fuel used in the previous operation of the model.

The calibration process is firstly done on the fuel pump 56, to determine its electrical current usage and the appropriate gain that should be used with that particular fuel pump 56. This is done by running the fuel pump 56, in the extraction mode, for a short period to ensure that any fuel which might be in the tank 7 is removed, its direction is then changed to send fuel into the tank 7 while the current is monitored, the gain of the amplifier is then adjusted to get an A/D current value of between 78% and 83%. When this is achieved, the gain and the actual A/D current values are recorded (this is the current under load). The fuel pump 56 is now stopped for a short period then reversed to extract all fuel from the tank 7, while monitoring the current flow. When the current suddenly falls to a low level, indicating that the fuel pump 56 is now running without load, the fuel pump 56 is again stopped after a steady state no load current reading is taken, this a/d value is recorded as the no load current. The high and low current values are then used to calculate the appropriate trip value which will be used during the operation to determine whether the fuel pump 56 is running under load or not.

The calibration of the tank 7 is done by firstly extracting all fuel from the tank 7, using the parameters obtained from the fuel pump 56 calibration to determine when the tank 7 is empty, at this point the fuel pump 56 reverses to fill the tank 7 while measuring the time taken. During this stage the user should visually monitor the level as it rises in the tank 7, stopping it at the fill mark 9 or level he wishes the tank 7 to be filled. Whenever the filling is stopped, there is an option to add more fuel or remove some in order to get to the desired level, When the user is satisfied with the level, a button is pressed to save this fill time in memory, after which the unit extracts all fuel from the tank 7, measuring the time taken to complete the extraction. These fill and extraction times are then recorded in memory for use in the automatic process when required, and also for the calculation of the percentage fuel used in previous model's operation. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A model airplane automatic fuel pump controller apparatus for controlling a pump used in filling a model craft's fuel tank, said apparatus comprising:

a microcontroller for storing and running preprogrammed software;

an operator input interface means, in communication with said microcontroller, for providing inputs to said microcontroller permitting the user to selectively initiate or terminate operations and calibrating procedures;

said software comprising at least one set of instructions readable by said microprocessor, said software comprising:

- a control software means for allowing the automatic filling of the model craft's fuel tank to a calibrated level;
- a current monitoring software means for monitoring the pump's motor current to determine whether it is pumping fuel;
- an auto extraction software means for removing fuel from the tank
- a tank calibration means for calibrating and storing the time taken to fill the tank; and
- a model name recording means for recording data for many different model crafts' fuel tanks.

2. An apparatus as recited in claim 1, wherein said control software means comprises:

a refilling means for removing remaining fuel from the model craft's fuel tank and for reversing the pump to put fuel into said tank.

3. An apparatus as recited in claim 2, wherein said refilling means further comprises:

means for using the calibration data to run the pump for the correct time it takes to fill the tank.

4. An apparatus as recited in claim 1, further comprising:

a percent fuel used display feature, for displaying the amount of fuel that was used to refill the tank, as a percentage, after the auto fill operation is completed or the amount that would have been used to refill the tank in the case of an auto extraction operation.

5. An apparatus as recited in claim 1, wherein said extraction software means further comprises:

means for shutting down the pump.

6. An apparatus as recited in claim 1, further comprising:

a pump calibration means for calibrating any pump which falls below the rated maximum operating current levels, recording in non-volatile memory, the gain value used by the microcontroller to achieve the maximum current reading and therefore resulting in a large bandwidth between full load and no load current levels during the operation of the said pump.

7. An apparatus as recited in claim 1, further comprising:

a model name and data base recording means for recording data for many different models, this data base will consist of an alphanumeric model name, the fill and extraction time for each model's tank as well as the pump data for the pump used during the tank calibration.

8. An apparatus as recited in claim 1, further comprising:

an extraction calibration means for allowing calibration and storage of the time taken to extract the full amount of fuel from the tank, for use in calculating the amount of fuel used in a previous engine run.

9. An apparatus as recited in claim 1, wherein said model name recording means further comprises:

a data base comprising an alphanumeric model name, the fill and extraction time for each model's tank as well as the pump data for the pump used during the tank calibration.

* * * * *